Patented Dec. 8, 1942

2,304,548

UNITED STATES PATENT OFFICE 2,304,548

RECLAIMED RUBBER

Paul J. Dasher, Akron, Ohio, assignor to The B. F. Goodrich Company, New York, N. Y., a corporation of New York No Drawing. Application November 1, 1939, Serial No. 302,365

10 Claims. (Cl. 260—720)

This invention relates to reclaimed rubber and has as its principal objects to provide an improved method for reclaiming soft-vulcanized rubber and to provide a reclaimed rubber closely approximating natural crude rubber in properties.

Due to the fact that reclaimed rubber is extensively used in the manufacture of many types of rubber articles, the reclaiming of vulcanized rubber has become one of the most important units of the modern rubber industry. Up to the present time the most widely used methods of reclaiming soft-vulcanized rubber have been the so-called acid method and the alkali method in which scrap vulcanized rubber is heated in the presence of an acid solution, or in the presence of an alkali solution, as the case may be. The reclaimed rubber produced by these and other known reclaiming methods is, however, by no means equivalent to the original crude rubber but differs from it in many important respects. For example, differences are evident in the milling and processing properties, in the tack, in solubility in the ordinary rubber solvents, in curing properties, and in similar physical characteristics. Summing up, it may be said that ordinary reclaimed rubber, as previously prepared, is merely plasticized vulcanized rubber. When this ordinary reclaimed rubber is mixed with solid crude rubber, a heterogeneous mixture is produced in which the reclaimed rubber is in the form of discrete particles that are clearly discernible by microscopic examination as being entirely distinct and separate from the solid crude rubber. Ordinary reclaimed rubber will not dissolve in the common rubber solvents merely by contact with the solvent and consequently will not produce a cement capable of drying to a smooth, homogeneous, and tacky film. Unlike solid crude rubber, freshly cut surfaces of ordinary reclaimed rubber cannot be pressed back together to form a tight bond.

I have discovered a method of reclaiming soft-vulcanized rubber that produces a plastic, homogeneous product possessing properties definitely superior to those of ordinary reclaimed rubber and, in fact, closely approximating the properties of natural crude rubber. This new reclaimed rubber can be broken down on a mill in much the same way that solid crude rubber is broken down. It dissolves in the ordinary rubber solvents, merely by contact with the solvent, to produce a cement that dries to a homogeneous tacky film. This reclaimed rubber blends perfectly with solid crude rubber and produces a homogeneous product with no discrete particles of the reclaimed rubber evident when examined under a microscope. Freshly cut surfaces of this new reclaimed rubber will form a tightly adhesive bond when merely pressed together. This new reclaimed rubber is not merely plasticized vulcanized rubber but is definitely a homogeneous material quite similar to milled natural crude rubber.

The reclaimed rubber of this invention can be blended with new crude rubber in substantial percentages for the manufacture of high quality rubber products. It can also be compounded with compounding ingredients in much the same way as crude rubber and can be vulcanized to form superior rubber articles. It can be molded, extruded and fabricated in any of the well known methods that are employed by the rubber industry and, in fact, may be used for any purpose for which prior reclaimed rubbers have been used.

To prepare the reclaimed rubber of this invention, I associate soft-vulcanized solid rubber, preferably rubber that is substantially free from fiber and in a finely divided condition, with hydroxylamine or its salts and heat the mixture until the rubber becomes plastic. In general, the heating will be comparable to the heating times and conditions now ordinarily employed in the acid and alkali reclaiming processes. The resulting plastic material may or may not be washed with water. The reclaimed rubber is then dried and thereupon is ready to be used like any solid crude rubber or other reclaimed rubber in the preparation and manufacture of rubber articles as well as the many other uses to which such materials have been subjected.

The reclaiming agents employed in this invention are hydroxylamine and those salts of hydroxylamine which have the property of hydrolyzing to produce free hydroxylamine. Salts such as the sulfate and hydrochloride of hydroxylamine which hydrolyze to produce free hydroxylamine and an acid having no serious deleterious effect upon rubber are preferred and the salts, such as the nitrate of hydroxylamine, which hydrolyze to produce a strong oxidizing acid such as nitric acid which seriously oxidizes and/or nitrates rubber, are generally to be avoided. The nitrate of hydroxylamine will, however, produce a plastic reclaimed rubber which may be used in any application where the oxidized and/or nitrated character of the product is not objectionable.

In order to illustrate embodiments of this invention the following specific examples are set forth:

*Example 1.*—1000 grams of ground red rubber inner tube scrap are mixed with 50 grams of hydroxylamine and 50 grams of water. This mixture is heated in an autoclave for 5 hours at 400° F. The resulting mass is then cooled, sheeted and dried.

*Example 2.*—1000 grams of ground rubber tire tread scrap are mixed with 60 grams of hydroxylamine sulfate and heated for ten hours at 430° F. The resulting mass is cooled and sheeted. The reclaimed rubber is thereupon ready to be used as any ordinary reclaimed rubber for the manufacture of any type rubber product.

*Example 3.*—1000 grams of ground grey rubber inner tube scrap are heated in an autoclave with 60 grams of hydroxylamine hydrochloride for 5 hours at 400° F. The resulting mass is then washed on a rubber wash mill and dried.

By carrying out the reclaiming operation in a steam jacketed Banbury mixer or the like, it is possible to mix the rubber and the reclaiming agent and simultaneously to heat the mixture. This is exemplified in the following example:

*Example 4.*—90 pounds of ground grey inner tube scrap are heated with 10.2 pounds of hydroxylamine sulfate in a No. 3 Banbury mixer. Steam at 400° F. is admitted to the jacket of the mixer and the batch is milled until the temperature of the batch reaches 400° F. This usually takes about 30 minutes. The resulting reclaimed rubber is then washed, dried, and sheeted.

Reclaimed rubber prepared according to the present invention may be utilized in replacement of substantial proportions of new crude rubber in the manufacture of a wide variety of rubber goods without materially affecting the quality of the products.

As will be apparent from the several specific examples hereinabove set forth and as has been previously indicated, the mixture of soft-vulcanized rubber and reclaiming agent ordinarily should be heated for a time and at a temperature of the same order as the times and temperatures customarily employed in the acid and alkali reclaiming processes. Heating is definitely essential to the present invention but the heating conditions are subject to considerable variation as is true in the conventional reclaiming processes. In ordinary commercial manufacturing operations, the heating period may vary from twenty minutes to twenty-four hours or even longer, while the temperatures may vary from 200° F. to 450° F., or even higher, so long as the temperature is not sufficiently high to decompose the materials; the higher temperatures ordinarily being employed for shorter periods and lower temperatures for longer periods. In all instances, the heating should be continued until the rubber is reduced to a plastic condition, which will be readily recognized by a worker familiar with reclaiming processes.

The herein described invention is applicable to any of the various types of soft-vulcanized rubber such as rubber scrap from boots, shoes, tires, tubes, belts, hose, and the like. Such scrap desirably should be substantially freed of fibrous material such as cord and fabric reinforcements and should preferably be comminuted.

While the invention has been described in connection with certain preferred procedures and materials, numerous modifications and variations may be effected therein without departing from the spirit and scope of the invention as defined by the appended claims.

I claim:

1. A method of reclaiming soft-vulcanized rubber which comprises heating the vulcanized rubber in the presence of a member of the class of compounds consisting of hydroxylamine and salts of hydroxylamine which hydrolyze to form free hydroxylamine, the heating being effected at a temperature not lower than 200° F. and continued until the rubber becomes plastic.

2. A method of reclaiming soft-vulcanized rubber which comprises heating the vulcanized rubber in the presence of hydroxylamine, the heating being effected at a temperature not lower than 200° F. and continued until the rubber becomes plastic.

3. A method of reclaiming soft-vulcanized rubber which comprises heating the vulcanized rubber in the presence of a salt of hydroxylamine which hydrolyzes to form free hydroxylamine, the heating being effected at a temperature not lower than 200° F. and continued until the rubber becomes plastic.

4. A method of reclaiming soft-vulcanized rubber which comprises heating the vulcanized rubber in the presence of hydroxylamine sulfate, the heating being effected at a temperature not lower than 200° F. and continued until the rubber becomes plastic.

5. A method of reclaiming soft-vulcanized rubber which comprises heating the vulcanized rubber in the presence of hydroxylamine hydrochloride, the heating being effected at a temperature not lower than 200° F. and continued until the rubber becomes plastic.

6. A reclaimed rubber which has been prepared by heating soft-vulcanized rubber at a temperature not lower than 200° F. and in the presence of a member of the class of compounds consisting of hydroxylamine and salts of hydroxylamine which hydrolyze to form free hydroxylamine.

7. A reclaimed rubber which has been prepared by heating soft-vulcanized rubber at a temperature not lower than 200° F. and in the presence of hydroxylamine.

8. A reclaimed rubber which has been prepared by heating soft-vulcanized rubber at a temperature not lower than 200° F. and in the presence of a salt of hydroxylamine which hydrolyzes to form free hydroxylamine.

9. A reclaimed rubber which has been prepared by heating soft-vulcanized rubber at a temperature not lower than 200° F. and in the presence of hydroxylamine sulfate.

10. A reclaimed rubber which has been prepared by heating soft-vulcanized rubber at a temperature not lower than 200° F. and in the presence of hydroxylamine hydrochloride.

PAUL J. DASHER.